United States Patent [19]

Mims

[11] 4,212,423
[45] Jul. 15, 1980

[54] MAGNETRON ANODE MANUFACTURE

[75] Inventor: James R. Mims, Bedford, N.H.

[73] Assignee: Raytheon Company, Lexington, Mass.

[21] Appl. No.: 944,824

[22] Filed: Sep. 22, 1978

[51] Int. Cl.² .................... B23K 1/04; H01J 25/587
[52] U.S. Cl. ................. 228/136; 29/25.17; 29/157.3 A
[58] Field of Search .......... 228/136; 29/157.3 A, 29/156.8 CF, 156.8 FC, 156.8 R, 25.17, 25.18, 520, 564.1, 564.2, 564.7, 33 K; 315/39.69; 83/188, 192, 178

[56] References Cited

U.S. PATENT DOCUMENTS

| | | | |
|---|---|---|---|
| 1,641,745 | 9/1927 | Dimberg | 29/156.8 R |
| 1,769,303 | 7/1930 | Neuner | 83/192 |
| 2,693,026 | 11/1954 | Simpelaar | 29/157.3 A |
| 2,944,326 | 7/1960 | Stadthaus et al. | 228/136 |
| 3,284,881 | 11/1966 | Clarke | 29/156.8 CF |
| 3,550,234 | 12/1970 | Herold | 29/156.8 FC |
| 3,608,167 | 9/1971 | Safran et al. | 29/25.17 |
| 3,875,469 | 4/1975 | Sato et al. | 315/39.69 |
| 3,911,516 | 10/1975 | Einhorn | 29/520 |
| 4,041,350 | 8/1977 | Shitara et al. | 315/39.75 |
| 4,056,756 | 11/1977 | Derby | 315/39.69 |

FOREIGN PATENT DOCUMENTS 884607  12/1961  United Kingdom ............. 29/157.3 A Primary Examiner—Daniel C. Crane
Attorney, Agent, or Firm—Richard M. Sharkansky; Joseph D. Pannone

[57] ABSTRACT

A method of manufacturing a magnetron anode and similarly shaped objects provides for the forming of anode vanes from a sheet of bulk material by stamping and the preparation of a tubular sleeve for forming the outer wall of the anode by punching a set of elongated slots therein. The vanes are inserted into the slots after which the periphery of each slot is crimped to cause a plastic flow of the material of the wall against the vanes to secure the vanes in their respective positions. The anode assemblies are then brazed in a furnace to permanently secure the vanes to the outer wall.

4 Claims, 3 Drawing Figures

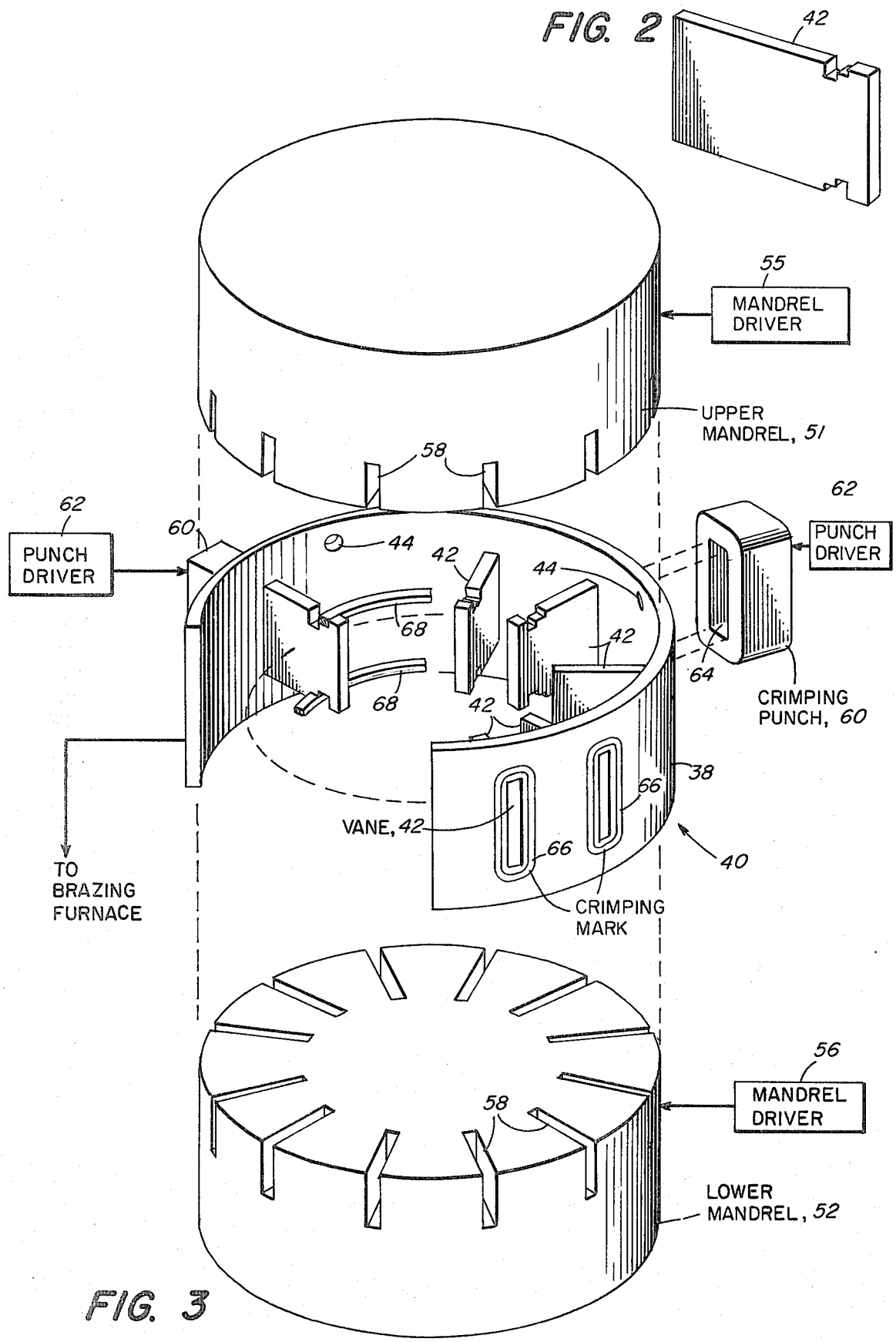

MAGNETRON ANODE MANUFACTURE

BACKGROUND OF THE INVENTION

This invention relates to the manufacture of magnetron anodes and similarly shaped objects and, more particularly, to a method of securing vanes to an outer wall of the magnetron prior to a brazing operation.

Magnetrons are frequently used as a source of electromagnetic energy. Today magnetrons are made in large quantities to provide electromagnetic energy at a frequency of 2450 MHz (megahertz) for microwave ovens wherein the energy serves to heat food contained within the oven. Typically, such magnetrons comprise an anode configured in the form of a tubular wall with a set of planar vanes projecting radially inward from the wall. For example, an anode having the foregoing structure is shown in the U.S. Pat. No. 2,832,005 which issued in the name of W. C. Brown on Apr. 22, 1958. Each of the vanes is provided with stepped slots to permit the electrical connection of shorting rings to alternate ones of the vanes.

A problem arises in the manufacture of such magnetron anode structures in that the vanes are brazed to the wall during one step of the manufacturing process. Typically, the vanes and the wall are constructed of copper with a silver plating being applied prior to the brazing operation. A jig supports the vanes in their respective positions within a brazing furnace as the silver and copper of the vanes and walls are brazed to a unitary structure. Such jigs must necessarily be able to withstand the high temperatures of the brazing furnace. However, in practice, it has been found that the jigs deteriorate due to the high temperatures with the result that the foregoing manufacturing process is unduly costly.

SUMMARY OF THE INVENTION

The foregoing problem is overcome and other advantages are provided by a method of manufacture of a magnetron anode and similarly shaped objects wherein the vanes are precut, as by a stamping operation, from a sheet of bulk material, typically copper, and the outer wall of the anode is formed from a tube of an electrically conducting material, typically copper, by cutting off a section of a tube of the material. The anode vanes are plated with silver in preparation for a subsequent brazing operation.

In accordance with the invention, the section of tubing is placed on a cylindrical mandrel having dies therein, each die having the shape of a slot, the slots being in planes parallel to the mandrel axis. A set of punches in registration with the dies on the mandrel are then directed through the section of tubing to produce a set of slots in the section of tubing. The vanes are then inserted in the slots to produce the configuration of the anode with the tubing serving as the anode wall.

The anode assembly is now prepared for the brazing operation. In lieu of utilizing a jig to suport the vanes in their respective positions, a crimping machine crimps the region of the wall adjacent each slot causing a plastic flow of the wall material against the vanes and thereby secures each vane in its respective position relative to the wall. Thereupon, the anode assembly is inserted in the brazing furnace for permanently securing the vanes to the wall.

While the intended purpose of this invention is the manufacture of magnetron anodes, it is to be understood that this invention may be beneficially employed in the manufacture of other vaned cylindrical structures such as, for example, heat exchangers and finned cooling devices.

BRIEF DESCRIPTION OF THE DRAWINGS

The aforementioned aspects and other features of the invention are explained in the following description taken in connection with the accompanying drawings wherein:

FIG. 2 is an isometric view of a vane for use in the manufacture of the magnetron anode; and FIG. 3 shows the crimping of the wall to the vanes.

DESCRIPTION OF THE PREFERRED EMBODIMENT

Figure 1:
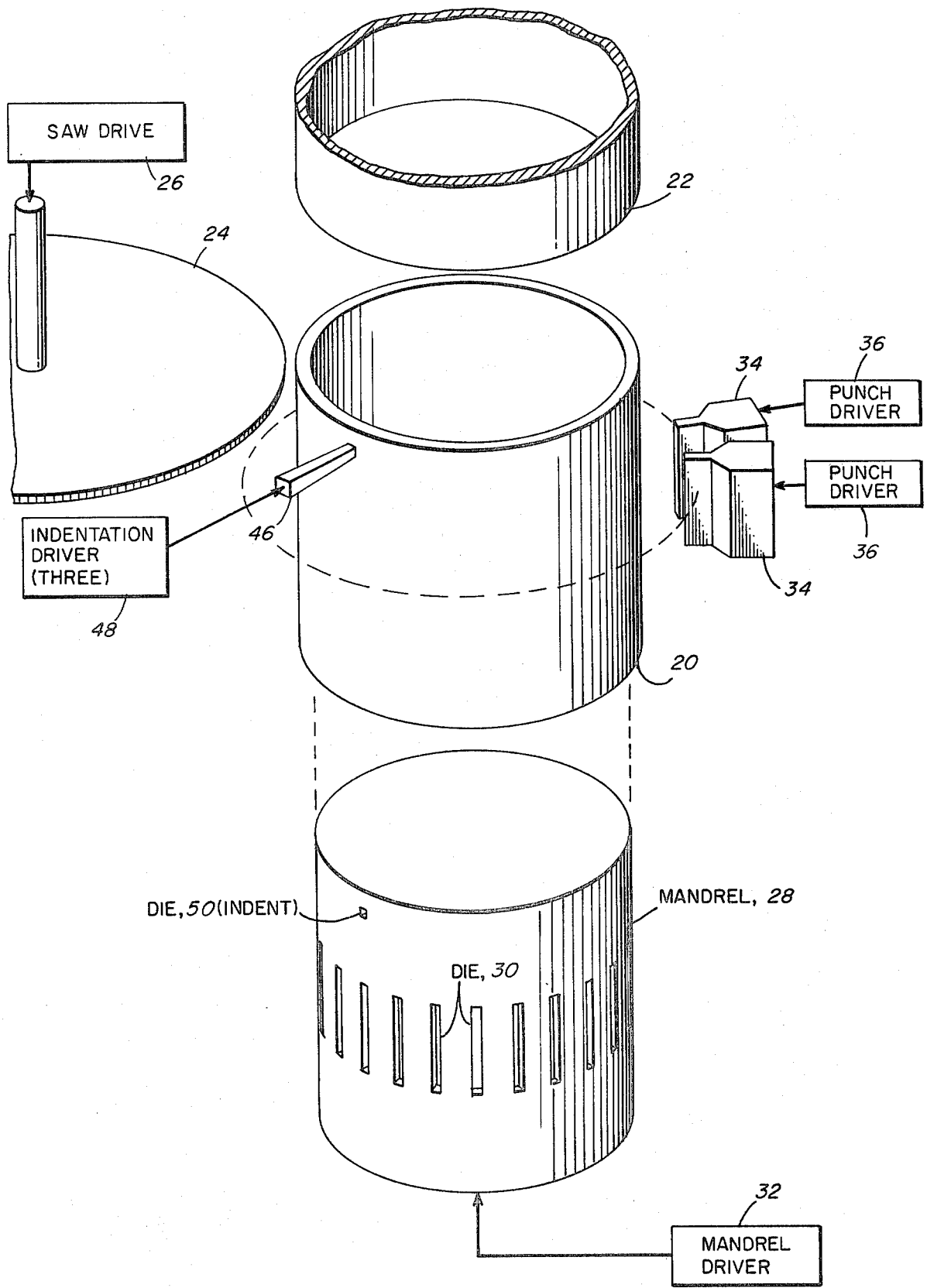
FIG. 1 is a diagrammatic view showing a cutting off of a tubular section from a tube for the anode wall, the figure further showing the insertion of a cylindrical mandrel having slotted dies therein and the emplacement of a set of punches around the tubular section for punching slots therein.

Referring to the FIGS. 1-3, a tubular section 20 is cut from a tube 22 by a saw 24, the saw being rotated and driven across the tube 22 by a driver 26 shown in block diagrammatic form representing a well-known mechanism for driving saws. A cylindrical mandrel 28 having dies 30 in the form of longitudinal slots uniformly spaced about the surface of the mandrel 28 is positioned within the tubular section 20 by a positioning mechanism shown as a driver 32. A set of punches 34 is positioned in registration with the dies 30 when the mandrel 28 is inserted within the section 20, the punches 34 being urged inwardly by drivers 36 for punching slots in the section 20 to produce a wall 38 for a magnetron anode 40. The anode 40 is shown in FIG. 3, a portion thereof being cut away to show a vane 42 inserted in a slot of the wall 38 and directed radially inward along a plane containing an axis of the anode 40.

To facilitate the manufacture, a set of three indentations 44 is provided in the wall 38, the indentations 44 being uniformly positioned about the wall 38 to serve as keys for facilitating the positioning of the wall 38 in successive work stations of the manufacturing operation. A punch 46 is driven by a driver 48 against a die 50 in the mandrel 28 to produce the indentation. The vanes 42 are plated with silver for the brazing operation. As shown in FIG. 3, the vanes 42 are inserted in the respective slots of the walls 38 to produce the anode 40, the anode 40 being aligned with upper and lower mandrels 51-52 for the crimping operation.

The mandrels 51-52 are driven together via drivers 55-56 to envelop the vanes 42 in slots 58 in the mandrels 51-52. The upper mandrel 51 advances half way down into the anode 40 and the lower mandrel 52 advances half way up into the anode 40. Crimping punches 60 are driven radially inward by drivers 62 toward the ends of the vanes 42 secured in the slots of the wall 38. Each punch 60 is provided with a channel 64 having a rectangular shape and a size which is slightly larger than that of a cross section of the vane 42. The punch 60 presses the material of the wall 38 against the mandrels 51-52 to produce a circumferential crimp 66 in the wall 38 around the end of each vane 42. In the event that the invention is used for the manufacture of a device wherein the vanes are to extend radially outward from the slots, such as a finned cooling element, the channels 64 are sufficiently large to encompass such vanes or fins during the crimping operation. The crimps 66 produce a plastic flow of material of the wall 38 along the edges of each slot toward the center of each slot for tightly securing the vanes 42 to the wall 38. Thereby, the vanes 42 are positioned by the mandrels 51–52 and secured by the crimping so that the anode 40 can then be removed from the mandrels 51–52 and placed in a brazing furnace. The vanes 42 are sufficiently well secured by the crimping to the wall 38 to remain in their respective positions during the brazing operation, so that upon completion of the brazing operation, the vanes 42 are permanently secured in their respective positions about the anode 40. Strapping rings 68 partially shown in FIG. 3, are then applied, as by brazing to the slotted portions of the vanes 42 to complete the fabrication of the anode 40.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A method of manufacture of a cylindrical structure having radially projecting vanes comprising:
   cutting a section of a tube to provide said cylindrical structure;
   inserting said cylindrical structure between a mandrel and a set of punches, said mandrel having an external surface which mates with an internal surface of said cylindrical structure, said mandrel having a set of dies in the form of slots in said external surface spaced circumferentially around said mandrel, said punches being aligned with said dies;
   punching a wall of said cylindrical surface form slots by driving said punches toward said dies;
   removing said mandrel and said set of punches from said cylindrical structure;
   placing said vanes in said slots;
   positioning upper and lower portions of a mandrel within said cylindrical structure, said upper and said lower mandrel portions being slotted to envelope said vanes;
   crimping the regions in said wall of said cylindrical structure around said slots in said wall to secure said vanes in said slots, said crimping being accomplished by advancing a set of punches along respective planes of said vanes against said upper and said lower mandrel portions; and
   brazing said vanes to said wall.

2. A method according to claim 1 further comprising a plating of said vanes with a metal to facilitate said brazing.

3. A method according to claim 2 wherein said wall and said vanes are composed of copper and wherein said metal being plated is silver, said plating providing a composition of silver and copper upon said brazing of said vanes to said wall.

4. A method according to claim 2 further comprising a stamping of said vanes to produce slots for holding strapping rings for utilizing said structure as a magnetron anode.

* * * * *

UNITED STATES PATENT OFFICE
CERTIFICATE OF CORRECTION

Patent No. 4,212,423    Dated July 15, 1980

Inventor(s) James R. Mims

It is certified that error appears in the above-identified patent and that said Letters Patent are hereby corrected as shown below:

Column 4, line 4, delete --form-- and replace with --to form--.

Signed and Sealed this

Second Day of June 1981

[SEAL]

Attest:

RENE D. TEGTMEYER

Attesting Officer    Acting Commissioner of Patents and Trademarks